(12) United States Patent
Lindblom et al.

(10) Patent No.: US 7,018,730 B2
(45) Date of Patent: Mar. 28, 2006

(54) DATA STORAGE TAPE WITH PATTERNED SURFACE

(75) Inventors: Steven L. Lindblom, Inver Grove Heights, MN (US); C. Thomas Jennings, Woodbury, MN (US); Larold L. Olson, Lindstrom, MN (US)

(73) Assignee: Imation Corp., Oakdale, MN (US)

( * ) Notice: Subject to any disclaimer, the term of this patent is extended or adjusted under 35 U.S.C. 154(b) by 67 days.

(21) Appl. No.: 10/730,164

(22) Filed: Dec. 8, 2003

(65) Prior Publication Data

US 2005/0123725 A1    Jun. 9, 2005

(51) Int. Cl.
*G11B 5/735*    (2006.01)
(52) U.S. Cl. .................................... 428/845.5
(58) Field of Classification Search ................ 428/169, 428/694 BB, 845.5; 360/2, 134
See application file for complete search history.

(56) References Cited

U.S. PATENT DOCUMENTS

| 3,255,307 | A | * | 6/1966 | Schuller ...................... 360/84 |
| 3,893,181 | A | * | 7/1975 | Desourdis ................... 360/84 |
| 5,589,247 | A | * | 12/1996 | Wallack et al. ............. 428/141 |
| 6,429,411 | B1 | | 8/2002 | Iwasaki et al. |
| 6,558,774 | B1 | * | 5/2003 | Saliba et al. ................ 428/156 |

FOREIGN PATENT DOCUMENTS

| GB | 1303971 | * | 1/1973 |
| JP | 03292613 | * | 12/1991 |

* cited by examiner

*Primary Examiner*—Stevan A. Resan
(74) *Attorney, Agent, or Firm*—Eric D. Levinson (57) ABSTRACT

Data storage tape includes a substrate having a first side and a second side opposite the first side, a recording layer disposed on the first side of the substrate, and a coating disposed on the second side of the substrate. A surface of the coating has a pattern formed therein such that the pattern communicates with at least one of a first edge and a second edge of the data storage tape.

22 Claims, 7 Drawing Sheets

DATA STORAGE TAPE WITH PATTERNED SURFACE

FIELD OF THE INVENTION

The present invention relates generally to data storage tape, and more particularly to a patterned surface formed on a backside of data storage tape.

BACKGROUND

Data storage tape cartridges are commonly used for storage and distribution of information for subsequent retrieval and use. Data storage tape cartridges generally include a housing, a tape reel rotatably disposed within the housing, and a length of data storage tape wound around the tape reel. The data storage tape includes a magnetic recording layer such that data may be read from or written to the data storage tape by a magnetic read/write head of a tape drive system. Data storage tape cartridges may include, for example, a dual tape reel configuration where interaction between the data storage tape and the read/write head takes place within or very near the housing, or a single tape reel configuration where interaction between the data storage tape and the read/write head takes place away from the housing.

Often, the data storage tape may utilize a coating on a backside of the tape to provide certain characteristics, such as static dissipation or air dissipation during winding of the tape. To provide these characteristics, the backside coating may be purposely made rougher than the magnetic recording layer provided on a front side of the tape. Unfortunately, this roughness can impact error performance of the tape due to impressions in the magnetic recording layer caused by asperities on the backside of the tape.

Accordingly, it is desirable for data storage tape which can dissipate air entrapped between coils of the data storage tape during a winding process.

SUMMARY

One aspect of the present invention provides data storage tape. The data storage tape includes a substrate having a first side and a second side opposite the first side, a recording layer disposed on the first side of the substrate, and a coating disposed on the second side of the substrate. A surface of the coating has a pattern formed therein such that the pattern communicates with at least one of a first edge and a second edge of the data storage tape.

Another aspect of the present invention provides a method of forming data storage tape. The method includes providing a substrate having a first side and a second side opposite the first side, disposing a recording layer on the first side of the substrate, and disposing a coating on the second side of the substrate, including forming a pattern in a surface of the coating and communicating the pattern with at least one of a first edge and a second edge of the data storage tape.

Another aspect of the present invention provides a method of coiling data storage tape. The method includes winding the data storage tape around a reel, including contacting a first side of the data storage tape with a second side of the data storage tape, and dissipating air entrapped between the first side and the second side of the data storage tape, including directing the entrapped air to at least one of a first edge and a second edge of the data storage tape with a pattern defined in the second side of the data storage tape and communicated with the at least one of the first edge and the second edge of the data storage tape.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
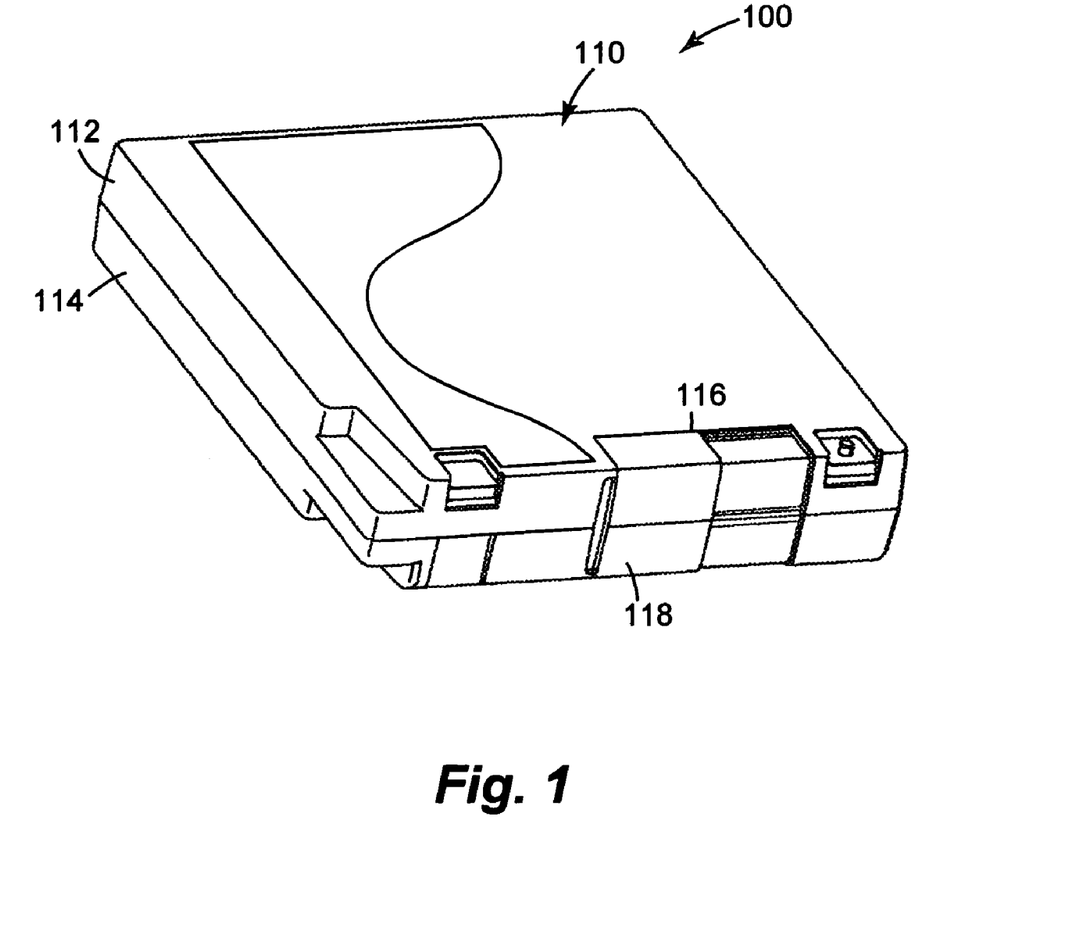
FIG. 1 is a perspective view of one embodiment of a data storage tape cartridge.
Figure 2:
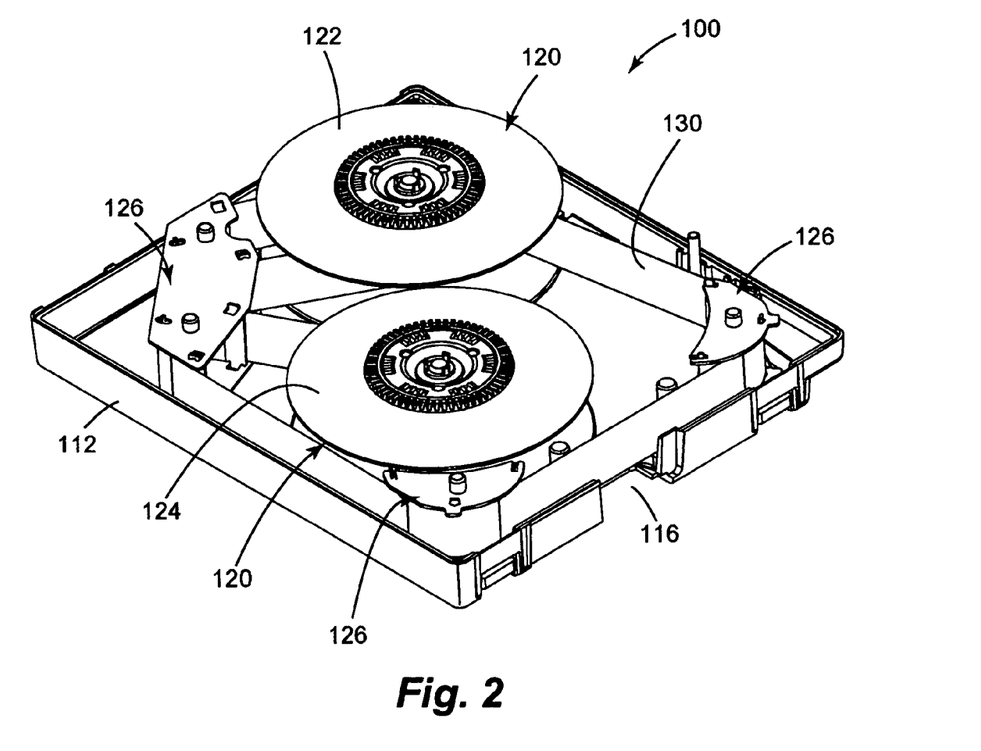
FIG. 2 is a perspective view of one embodiment of a data storage tape cartridge with a portion of the housing removed.
Figure 3:
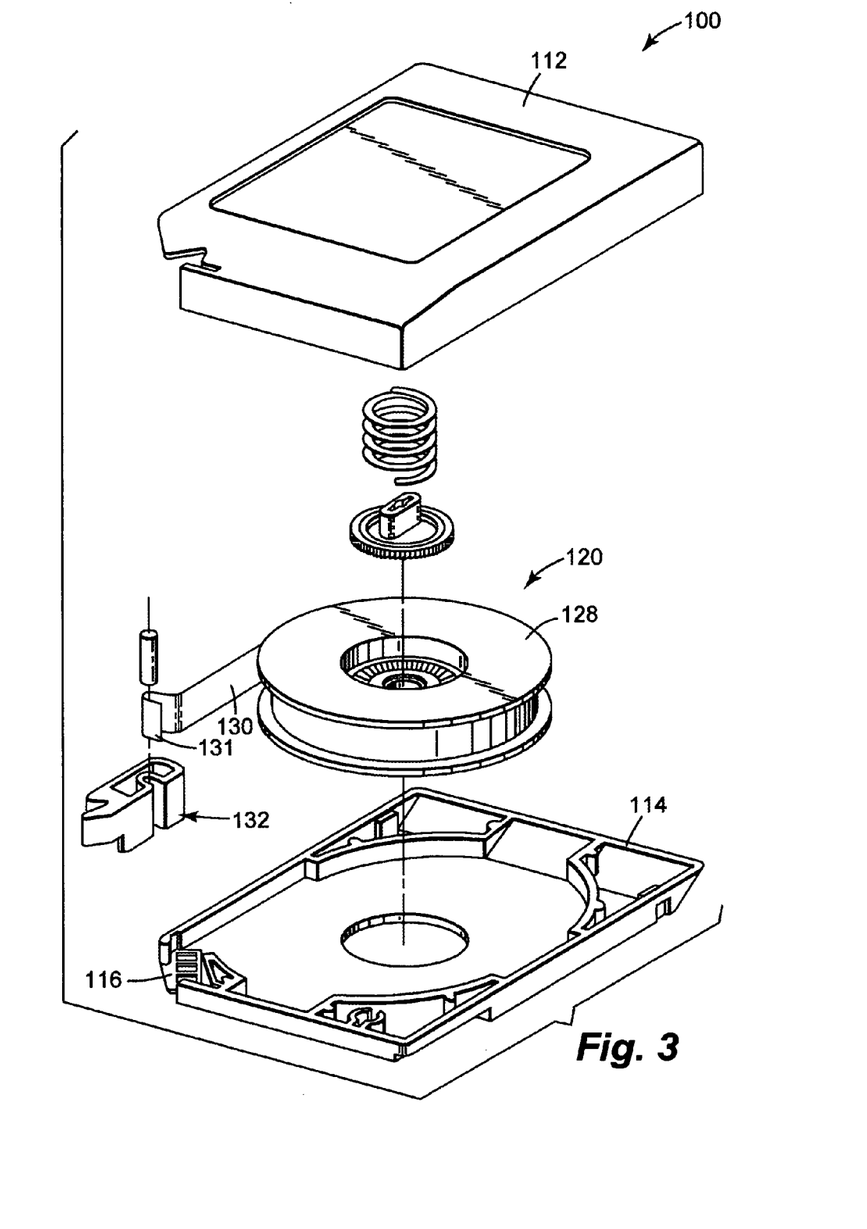
FIG. 3 is an exploded perspective view of another embodiment of a data storage tape cartridge.

FIGS. 1–3 illustrate one embodiment of a data storage tape cartridge 100. Data storage tape cartridge 100 includes a housing 110, one or more tape reels 120, and a length of data storage tape 130. Tape reel 120 is rotatably disposed within housing 110 and data storage tape 130 is wound around a portion of tape reel 120.

In one embodiment, housing 110 is formed by housing sections 112 and 114 each configured to be reciprocally mated to one another to form an enclosure or container for data storage tape 130. As such, housing sections 112 and 114 combine to form a window 116 through which data storage tape 130 can be accessed. In one embodiment, data storage tape cartridge 100 includes a door 118 slidably secured to housing 110 such that door 118 can be selectively moved to provide access to window 116.

Preferably, housing 110 is sized to be received by a standard tape drive (not shown). Housing 110 may be sized, for example, for use with a 5.25 inch (130 mm) form factor drive, a 3.5 inch (90 mm) form factor drive, or other size tape drive.

In one embodiment, as illustrated in FIG. 2, data storage tape cartridge 100 includes a first tape reel 122, a second tape reel 124, and a plurality of guides 126. As such, tape reels 122 and 124 and guides 126 cooperate to define a tape path for data storage tape 130 within housing 110. Data storage tape 130 is fed, for example, from tape reel 122 and guided through housing 110 by guides 126 to tape reel 124. While data storage tape 130 is guided through housing 110, data storage tape 130 is guided along window 116 to permit interaction with data storage tape 130 by a read/write head (not shown). It will be recognized by one of skill in the art that the illustrated tape path is but one of many available configurations. By incorporating different guides at various locations, the resulting tape path may be substantially different from that shown in FIG. 2.

In another embodiment, as illustrated in FIG. 3, data storage tape cartridge 100 includes a single tape reel 128. In addition, data storage tape cartridge 100 includes a leader block 132 to which a free end 131 of data storage tape 130 is attached. As such, leader block 132 is engaged by a tape drive mechanism (not shown) such that data storage tape 130 is fed from tape reel 128 through window 116 and directed along a tape path within the tape drive mechanism. Thus, the tape drive mechanism directs data storage tape 130 into engagement with a read/write head (not shown).

Figure 4:
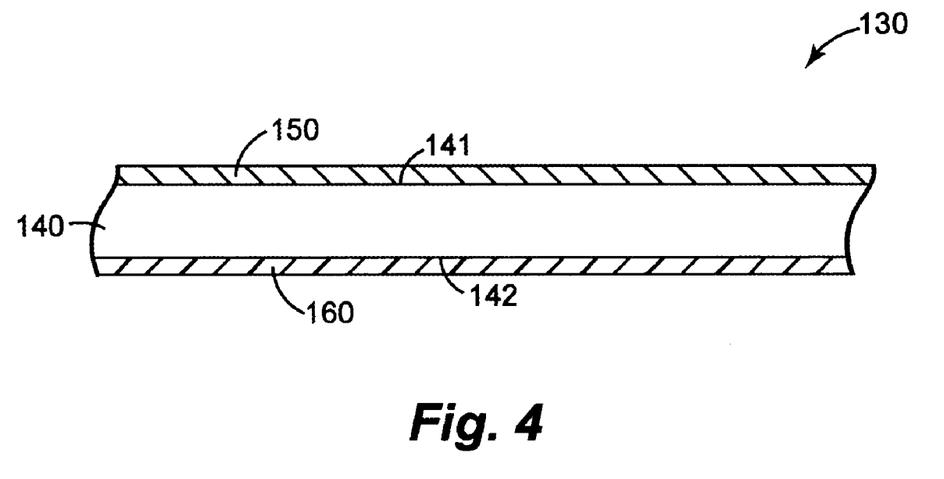
FIG. 4 is a simplified cross-sectional view of one embodiment of data storage tape.

In one embodiment, as illustrated in FIG. 4, data storage tape 130 includes a substrate 140, a recording layer 150, and a backside coating 160. In one embodiment, substrate 140 has a first side 141 and a second side 142 opposite first side 141 such that recording layer 150 is disposed on first side 141 and backside coating 160 is disposed on second side 142. As such, recording layer 150 forms a first or front surface 134 of data storage tape 130 and backside coating 160 forms a second or backside surface 135 of data storage tape 130.

In one embodiment, substrate 140 includes a non-magnetic substrate (e.g., a film for magnetic recording tape applications) and recording layer 150 includes a magnetic recording layer or film formed on one side of the non-magnetic substrate. The non-magnetic substrate includes, for example, a base material such as polyethylene naphthalate (PEN) or polyethylene terephthalate (PET) and the magnetic recording layer includes, for example, a layer of magnetic material dispersed within a suitable binder system. In one embodiment, the magnetic recording layer may include, for example, a magnetic metal particle powder or pigment dispersed in a polymeric binder.

As illustrated in the embodiment of FIG. 4, backside coating 160 is disposed on second side 142 of substrate 140. In one embodiment, backside coating 160 includes, for example, polyurethane, alumina, and carbon black. As such, backside coating 160 improves, for example, the durability, conductivity, and/or tracking characteristics of data storage tape 130.

It is understood that FIG. 4 is a simplified schematic illustration of one embodiment of data storage tape 130, and that additional layers or coatings may be formed on and/or applied to one or more sides of substrate 140 and/or recording layer 150. In addition, it is understood that the relative thicknesses of substrate 140, recording layer 150, and backside coating 160 may vary from that illustrated.

Figure 5:
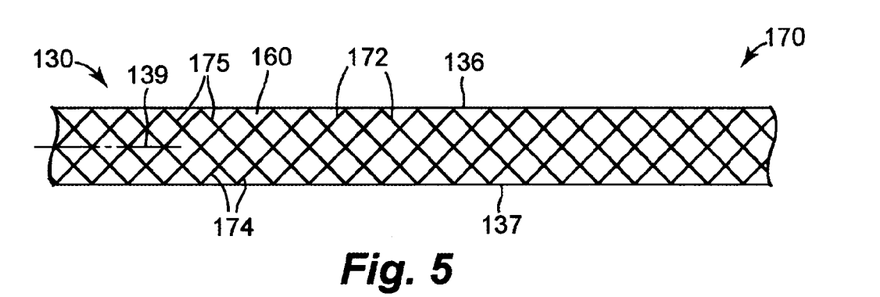
FIG. 5 is a schematic plan view of one embodiment of a pattern defined in a backside coating of data storage tape according to the present invention.
Figure 6:
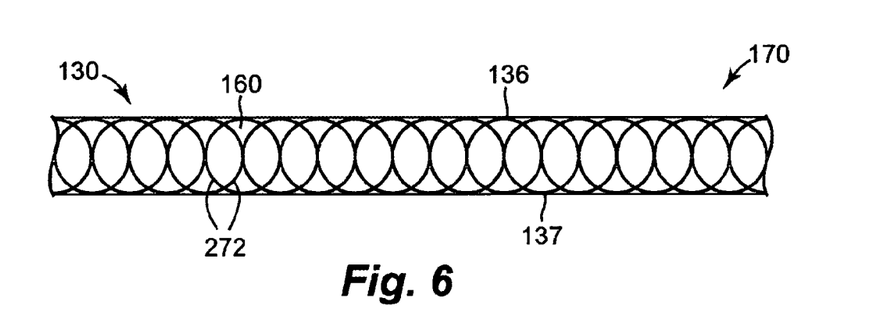
FIG. 6 is a schematic plan view of another embodiment of a pattern defined in a backside coating of data storage tape according to the present invention.
Figure 7:
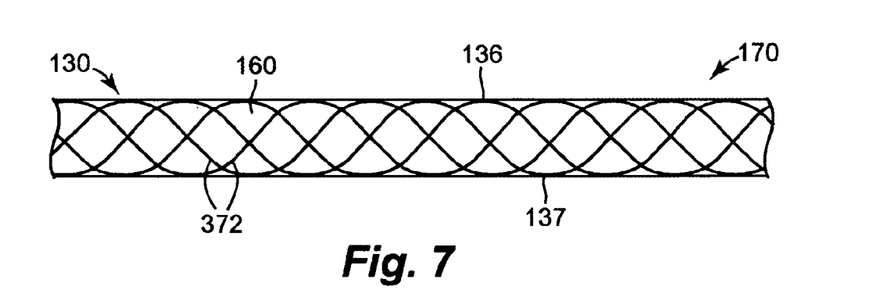
FIG. 7 is a schematic plan view of another embodiment of a pattern defined in a backside coating of data storage tape according to the present invention.

In one embodiment, as illustrated in FIGS. 5–7, a pattern 170 is defined in backside coating 160 of data storage tape 130. More specifically, pattern 170 includes a defined or uniform pattern formed in backside coating 160. As described below, pattern 170 includes, for example, a plurality of indentations or recesses formed in backside coating 160. In one embodiment, pattern 170 communicates with a first edge 136 and/or a second edge 137 of data storage tape 130. As such, pattern 170 channels or directs air to first edge 136 and/or second edge 137 of data storage tape 130 when data storage tape 130 is coiled, as described below.

FIG. 5 illustrates one embodiment of pattern 170 defined in backside coating 160 of data storage tape 130. As illustrated in the embodiment of FIG. 5, pattern 170 includes a plurality of diagonal recesses 172 formed in backside coating 160. In one embodiment, diagonal recesses 172 extend between first edge 136 and second edge 137 of data storage tape 130 so as to communicate with first edge 136 and second edge 137. Diagonal recesses 172 extend along a length of data storage tape 130 and are oriented at an angle to a longitudinal axis 139 of data storage tape 130.

In one embodiment, diagonal recesses 172 include a first plurality of diagonal recesses 174 oriented at a first angle to longitudinal axis 139 and a second plurality of diagonal recesses 175 oriented at a second angle to longitudinal axis 139. In addition, in one embodiment, diagonal recesses 174 and 175 intersect. As such, in one embodiment, diagonal recesses 174 and 175 form overlapping chevron or diamond-shaped patterns along a length of data storage tape 130.

FIG. 6 illustrates another embodiment of pattern 170 defined in backside coating 160 of data storage tape 130. As illustrated in the embodiment of FIG. 6, pattern 170 includes a plurality of circular recesses 272 formed in backside coating 160. In one embodiment, circular recesses 272 extend between first edge 136 and second edge 137 of data storage tape 130 so as to communicate with first edge 136 and second edge 137. As such, circular recesses 272 form a plurality of arcuate and, more specifically, semi-circular recesses extended between first edge 136 and second edge 137 of data storage tape 130. In one embodiment, circular recesses 272 overlap and are formed along a length of data storage tape 130.

FIG. 7 illustrates another embodiment of pattern 170 defined in backside coating 160 of data storage tape 130. As illustrated in the embodiment of FIG. 7, pattern 170 includes a plurality of sinusoidal recesses 372 formed in backside coating 160. In one embodiment, sinusoidal recesses 372 extend between first edge 136 and second edge 137 of data storage tape 130 so as to communicate with first edge 136 and second edge 137. As such, sinusoidal recesses 372 form a plurality of arcuate recesses extended between first edge 136 and second edge 137 of data storage tape 130. In one embodiment, sinusoidal recesses 372 overlap and are formed along a length of data storage tape 130.

Figure 8:
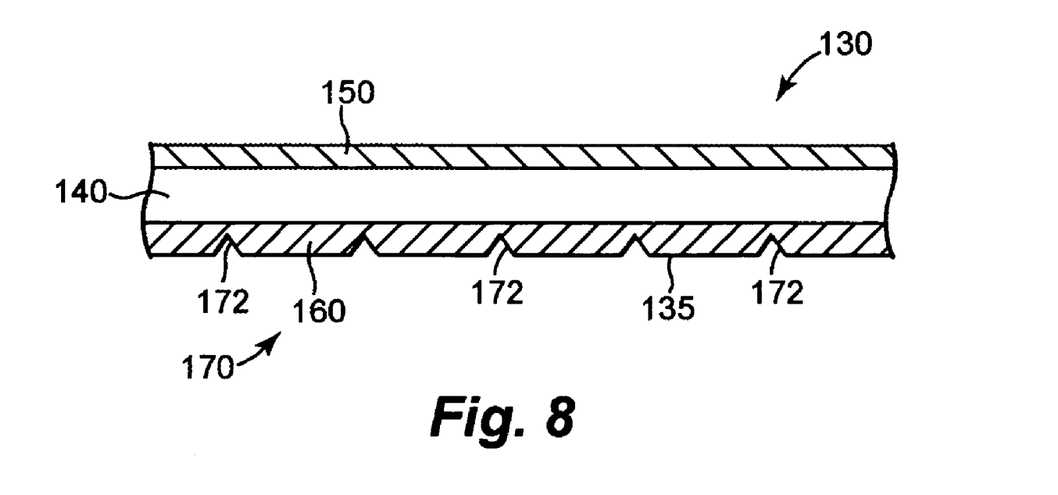
FIG. 8 is a simplified cross-sectional view illustrating one embodiment of a pattern defined in a backside coating of data storage tape according to the present invention.

As illustrated in the embodiment of FIG. 8, pattern 170 is defined by recesses 172 (including recesses 272 and 372) formed in backside coating 160 of data storage tape 130. As such, pattern 170 is recessed relative to backside surface 135 of data storage tape 130. While recesses 172 are illustrated as being triangular in shape, it is understood that recesses 172 may be formed of other shapes including, for example, rectangular or semi-circular shapes.

In one embodiment, recesses 172 (including recesses 272 and 372) may be formed, for example, by laser ablation of backside coating 160 or compression rolling of backside coating 160. In one embodiment, during laser ablation of backside coating 160, for example, selective areas of backside coating 160 are removed to form recesses 172. In one embodiment, during compression rolling of backside coating 160, data storage tape 130 is fed, for example, between a pair of rollers such that a roller contacting backside coating 160 imprints recesses 172 and, therefore, pattern 170 in backside coating 160.

Figure 9:
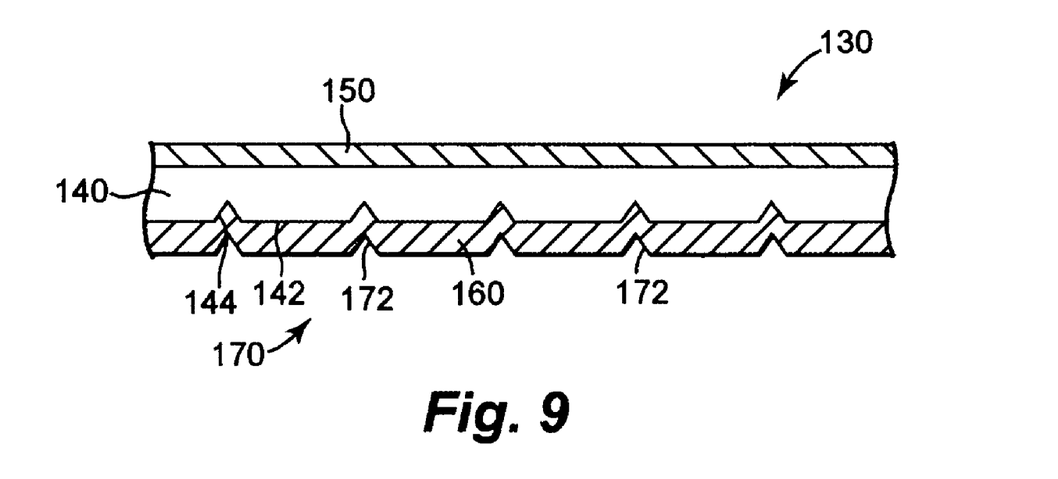
FIG. 9 is a simplified cross-sectional view illustrating another embodiment of a pattern defined in a backside coating of data storage tape according to the present invention.

In one embodiment, as illustrated in FIG. 9, pattern 170 is formed by defining patterned recesses 144 in second side 142 of substrate 140 of data storage tape 130 and conforming backside coating 160 to patterned recesses 144. More specifically, backside coating 160 conforms to second side 142 of substrate 140, including patterned recesses 144, such that recesses 172 (including recesses 272 and 372) are formed in backside coating 160. As such, pattern 170 is defined in backside coating 160.

In one embodiment, patterned recesses 144 may be formed, for example, by laser ablation of substrate 140 or compression rolling of substrate 140. In one embodiment, during laser ablation of substrate 140, for example, selective areas of substrate 140 and, more specifically, second side 142 of substrate 140 are removed to form patterned recesses 144. In one embodiment, during compression rolling of substrate 140, substrate 140 is fed, for example, between a pair of rollers such that a roller contacting second side 142 of substrate 140 imprints patterned recesses 144 in second side 142.

Figure 10:
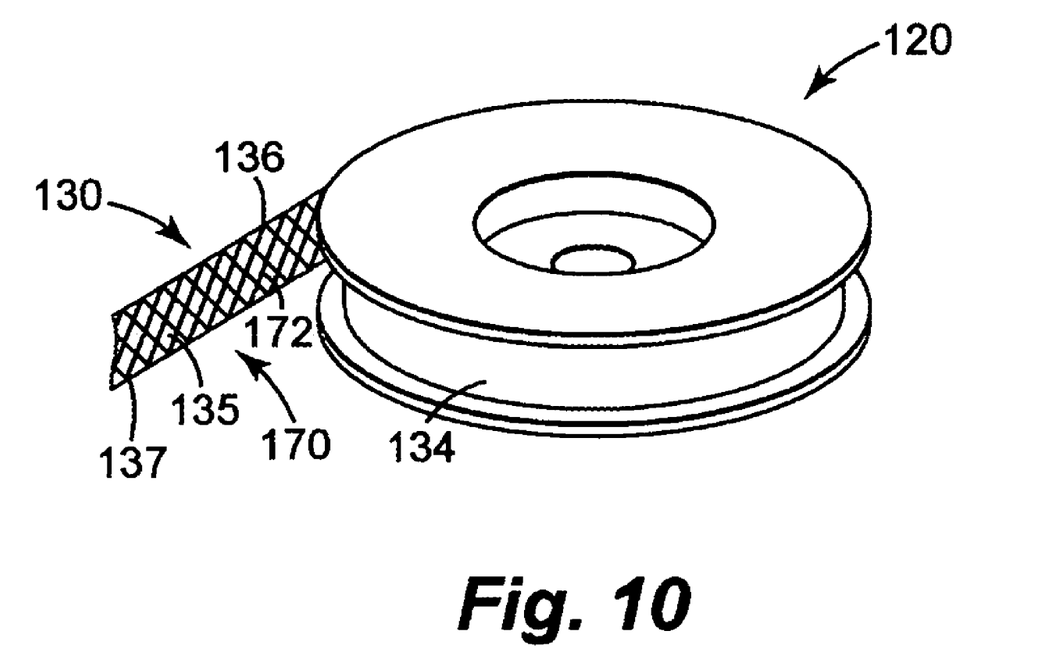
FIG. 10 is a perspective view illustrating one embodiment of coiling data storage tape formed according to the present invention on a tape reel.

In one embodiment, as illustrated in FIG. 10, data storage tape 130 is coiled around tape reel 120. More specifically, data storage tape 130 is wound around tape reel 120 such that back surface 135 of data storage tape 130 contacts front surface 134 of data storage tape 130. As such, during winding of data storage tape 130 around tape reel 120, air may become entrapped between front surface 134 and back surface 135. By forming pattern 170 in backside coating 160 (FIG. 4), however, air entrapped between front surface 134 and back surface 135 can be directed to first edge 136 and/or second edge 137 of data storage tape 130 by recesses 172 (including recesses 272 and 372) extended between and communicated with first edge 136 and/or second edge 137. Thus, the entrapped air can be dissipated, thereby enhancing the winding process. It is understood that the illustration of pattern 170, including recesses 172, has been exaggerated for clarity of the invention.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. Data storage tape having a first edge and a second edge opposite the first edge, the data storage tape comprising:
    a substrate having a first side and a second side opposite the first side, wherein the second side of the substrate has a pattern formed therein;
    a substantially uniform recording layer disposed on the first side of the substrate; and
    a coating disposed on the second side of the substrate, wherein the coating conforms to the pattern in the second side of the substrate to form the pattern in a surface of the coating,
    wherein the pattern communicates with at least one of the first edge and the second edge of the data storage tape.

2. The data storage tape of claim 1, wherein the pattern communicates with the first edge and the second edge of the data storage tape.

3. The data storage tape of claim 1, wherein the data storage tape has a first surface and a second surface opposite the first surface, wherein the recording layer forms the first surface of the data storage tape and the surface of the coating constitutes the second surface of the data storage tape.

4. The data storage tape of claim 1, wherein the pattern is recessed relative to the surface of the coating.

5. The data storage tape of claim 1, wherein the pattern includes a plurality of diagonal recesses extended between the first edge and the second edge of the data storage tape.

6. The data storage tape of claim 5, wherein the diagonal recesses include a first plurality of diagonal recesses and a second plurality of diagonal recesses formed along a length of the data storage tape, wherein the first plurality of diagonal recesses and the second plurality of diagonal recesses intersect.

7. The data storage tape of claim 1, wherein the pattern includes a plurality of arcuate recesses extended between the first edge and the second edge of the data storage tape.

8. The data storage tape of claim 7, wherein the arcuate recesses overlap.

9. The data storage tape of claim 7, wherein the arcuate recesses include a plurality of circular recesses formed along a length of the data storage tape.

10. The data storage tape of claim 7, wherein the arcuate recesses include a plurality of sinusoidal recesses formed along a length of the data storage tape.

11. The data storage tape of claim 1, wherein the pattern is adapted to dissipate air to the at least one of the first edge and the second edge of the data storage tape when the data storage tape is coiled.

12. A method of forming data storage tape, the method comprising:
    providing a substrate having a first side and a second side opposite the first side;
    forming a pattern in the second side of the substrate;
    disposing a recording layer on the first side of the substrate, including forming a substantially uniform surface of the data storage tape; and
    disposing a coating on the second side of the substrate, including conforming the coating to the pattern in the second side of the substrate and forming the pattern in a surface of the coating,
    wherein the pattern communicates with at least one of a first edge and a second edge of the data storage tape.

13. The method of claim 12, wherein forming the pattern in the surface of the coating includes communicating the pattern with the first edge and the second edge of the data storage tape.

14. The method of claim 12, wherein disposing the recording layer on the first side of the substrate includes forming a first surface of the data storage tape, and wherein disposing the coating on the second side of the substrate includes forming a second surface of the data storage tape, wherein the surface of the coating constitutes the second surface of the data storage tape.

15. The method of claim 12, wherein forming the pattern in the surface of the coating includes recessing the pattern relative to the surface of the coating.

16. The method of claim 12, wherein forming the pattern in the surface of the coating includes extending a plurality of diagonal recesses between the first edge and the second edge of the data storage tape.

17. The method of claim 12, wherein forming the pattern in the surface of the coating includes extending one of a plurality of circular recesses and a plurality of sinusoidal recesses between the first edge and the second edge of the data storage tape.

18. A method of coiling data storage tape, the method comprising:
- winding the data storage tape around a reel, including contacting a first side of the data storage tape with a second side of the data storage tape, the first side of the data storage tape including a substantially uniform recording layer and the second side of the data storage tape including a coating; and
- dissipating air entrapped between the first side and the second side of the data storage tape, including directing the entrapped air to at least one of a first edge and a second edge of the data storage tape with a pattern defined in the second side of the data storage tape and communicated with the at least one of the first edge and the second edge of the data storage tape,
- wherein the pattern is formed in a substrate of the data storage tape and the coating conforms to the pattern in the substrate to form the pattern in a surface of the coating.

19. The method of claim 18, wherein the pattern is recessed relative to the surface of the coating.

20. The method of claim 18, wherein the pattern communicates with the first edge and the second edge of the data storage tape.

21. The method of claim 18, wherein the pattern includes a plurality of diagonal recesses extended between the first edge and the second edge of the data storage tape.

22. The method of claim 18, wherein the pattern includes a plurality of arcuate recesses extended between the first edge and the second edge of the data storage tape.

* * * * *